United States Patent [19]

Schneider

[11] Patent Number: 5,370,447
[45] Date of Patent: Dec. 6, 1994

[54] CHILDREN'S STOOL FOR AUTOMOBILE

[76] Inventor: Jinghau H. Schneider, 829 Handley Ct., Mundelein, Ill. 60060

[21] Appl. No.: 976,569

[22] Filed: Nov. 16, 1992

[51] Int. Cl.$^5$ ............................................. A47C 16/02
[52] U.S. Cl. .............................. 297/423.45; 297/461; 297/462; 5/118
[58] Field of Search .............. 297/438, 439, 461, 462, 297/423.45; 5/118, 465, 925; 482/52

[56] References Cited

U.S. PATENT DOCUMENTS

| | | | |
|---|---|---|---|
| 2,108,241 | 2/1938 | Wallace | 297/439 X |
| 2,341,080 | 2/1944 | Burkholder | 297/439 |
| 2,648,072 | 8/1953 | De Blieux | 5/94 |
| 2,654,420 | 10/1953 | Rogers | 297/438 X |
| 2,994,365 | 8/1961 | Ziegler | 297/439 |
| 3,696,449 | 10/1972 | Smith | 5/94 |
| 3,785,702 | 1/1974 | Buehring | 297/439 |
| 4,228,745 | 10/1980 | Gale | 297/423.45 X |
| 4,678,234 | 6/1987 | Wilson | 297/423.45 |
| 5,158,512 | 10/1992 | Irwin et al. | 482/52 |
| 5,176,596 | 1/1993 | Ullman | 297/439 X |
| 5,184,987 | 2/1993 | Wilkinson | 297/438 X |

FOREIGN PATENT DOCUMENTS 2457071 6/1976 Germany .................. 5/94

Primary Examiner—Michael F. Trettel
Attorney, Agent, or Firm—Paul H. Gallagher

[57] ABSTRACT

A plurality of sections placed in a stack to form a stool. The stool can be put in the well of the automobile between the front and back seat. Certain of the sections can be left in the well, and others on the back seat for the child to sit on and place his feet on the sections of the well. The sections are temporarily held together against lateral displacement by various devices. In all of the forms the device has an opening for receiving the hump in the floor of the automobile. In another form, the device is somewhat in the appearance of a table forming a first section, and a second section stacked with the first section.

13 Claims, 3 Drawing Sheets

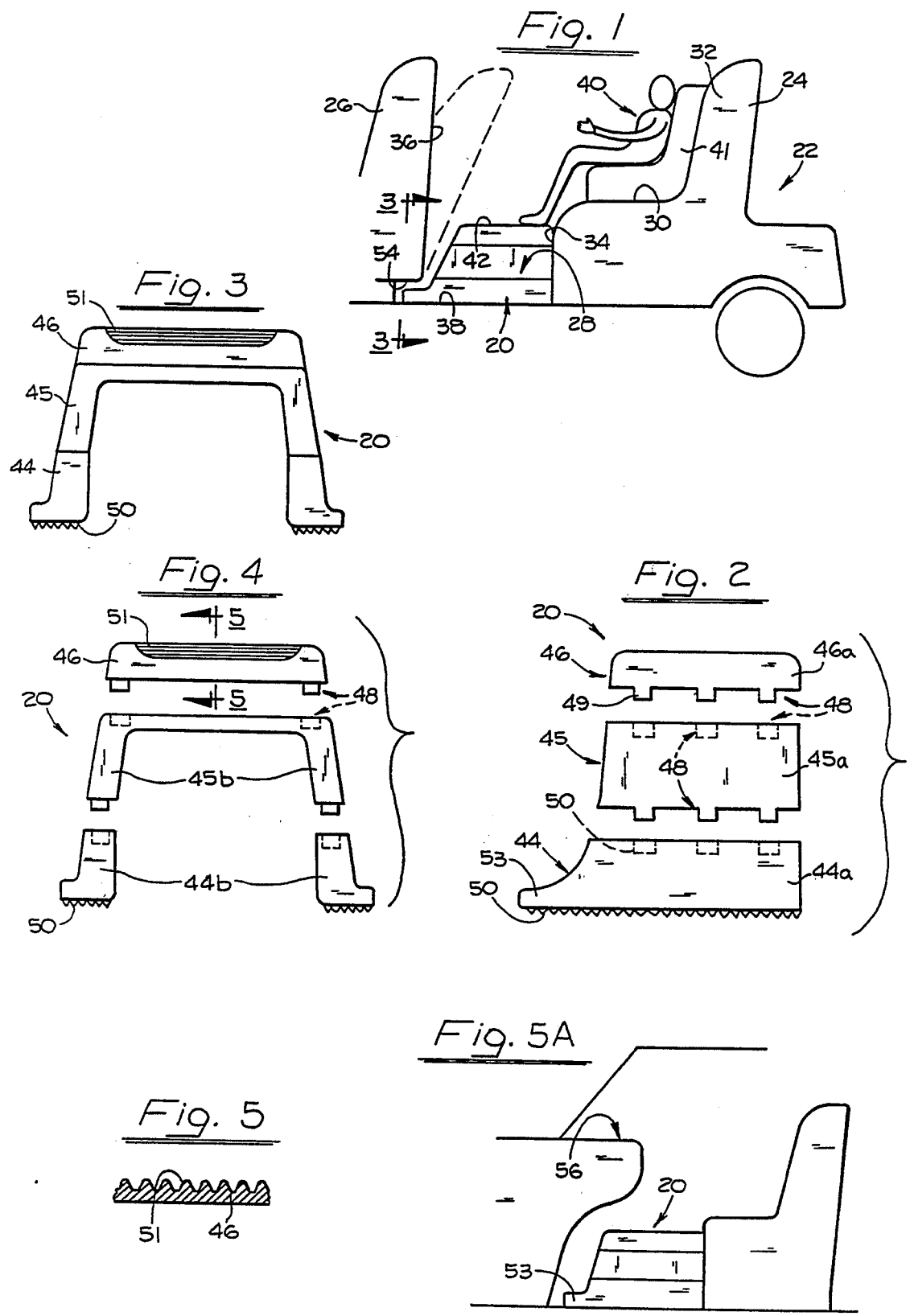

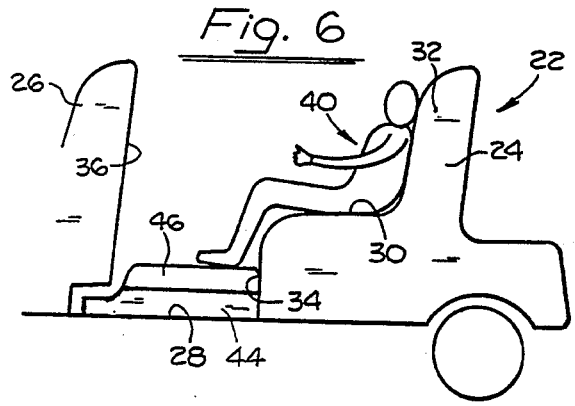
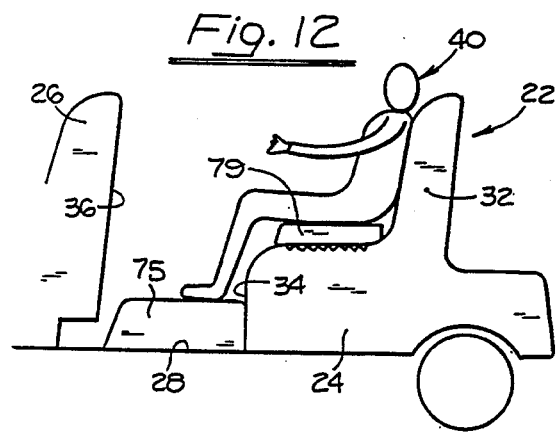
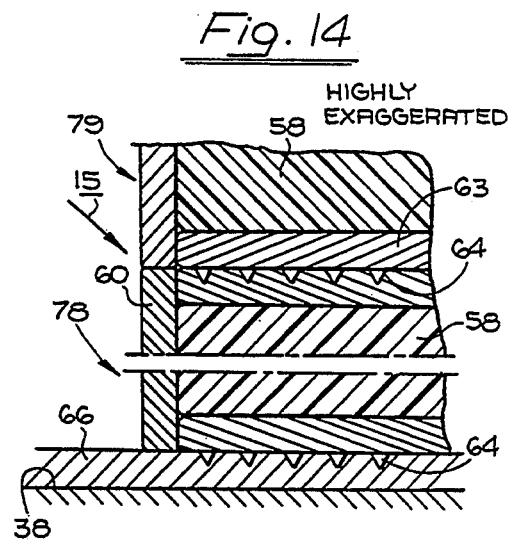
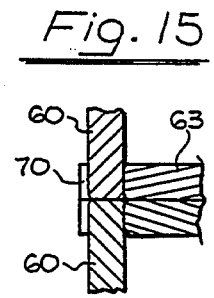
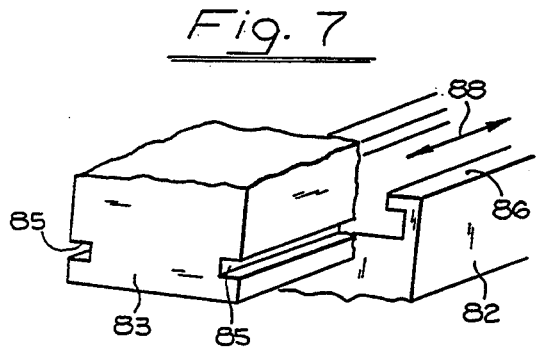
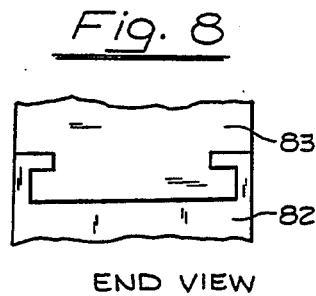
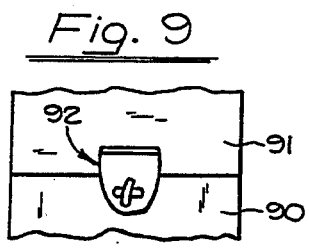

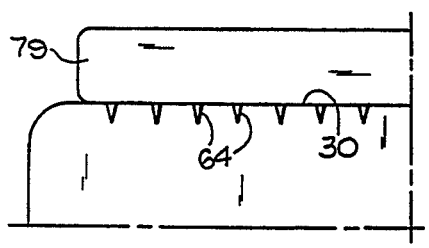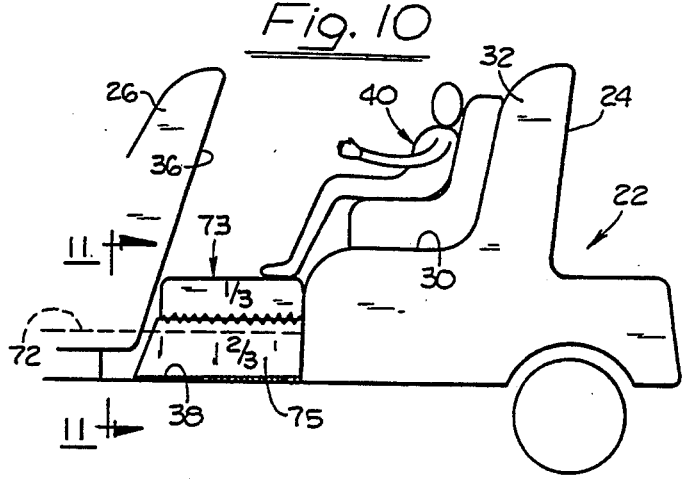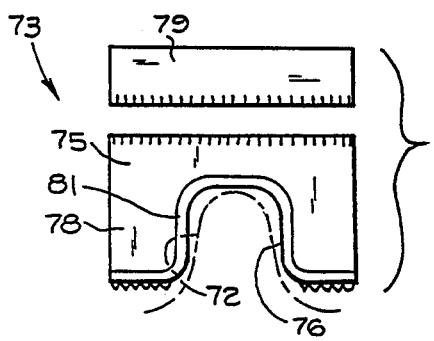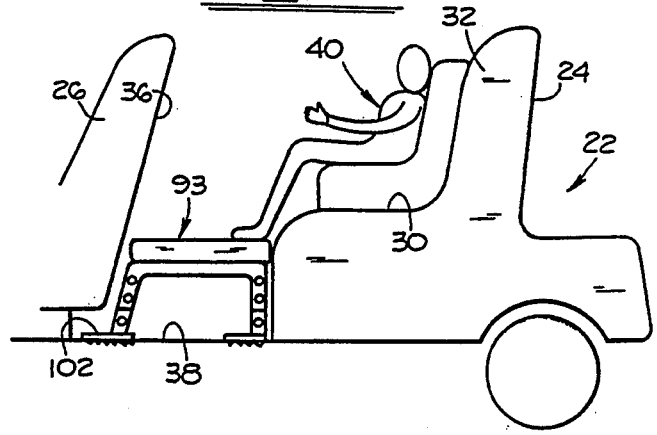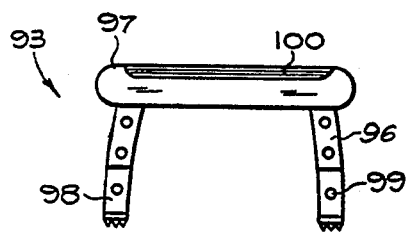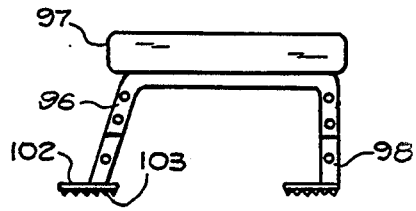

5,370,447

CHILDREN'S STOOL FOR AUTOMOBILE

BRIEF SUMMARY OF THE INVENTION

The invention concerns the condition of a child who, because of his small size, encounters much discomfort because his legs are not long enough to reach the floor, and be supported thereby, and therefore they dangle, with pulling force imposed on the thighs, causing aches in the thighs and other parts of the body.

A broad object of the invention is to provide a stool device for placement in an automobile, to enable a child to be seated without the discomforts and possible aches and pains, referred to above.

Another object is to provide a device of the foregoing character, made up of parts that can be arranged in different positions to accommodate a child in his different stages of growth.

Another and more specific object is to provide a device of the character just referred to, which is made up of parts, and in which the various parts can be positioned for accommodating the feet of the child, and others for seating thereon.

Another object is to provide a device of the foregoing character having novel means for retaining the sections of the device in their proper position, and to prevent or retard shifting movement between the sections.

Still another object is to provide such a device a plurality of which have different shapes for accommodating different shapes of elements in the automobile, such as the well known hump in the floor.

A still more specific object is to provide such a device which is well adapted to placement in the well of the automobile between the back and front seats, or in front of the front seat as well. The device is dimensioned and placed to assure its proper securement in position.

DETAIL DESCRIPTION OF THE VARIOUS FIGURES OF THE DRAWINGS

FIG. 1 is diagrammatic and fragmentary in nature, showing the device of the invention placed in an automobile, showing the automobile in side view and the device of the invention in side view.

FIG. 2 is a side view of the stool, with the sections thereof separated and spaced apart.

FIG. 3 is a front view of the stool taken at line 3—3 of FIG. 1. The stool made up of sections but with the sections fitted together.

FIG. 4 is a front view with the sections separated and spaced apart.

FIG. 5 is a sectional view taken at line 5—5 of FIG. 4.

FIG. 5A is a view oriented according to FIG. 1, with the device in front of the front seat of the automobile.

FIG. 6 is a view similar to FIG. 1 but having only a lower section and top section of the device in place.

FIG. 7 is a fragmentary perspective view showing another modified form of means for securing the sections together.

FIG. 8 is an end view of the device of FIG. 7 showing the sections fitted together.

FIG. 9 is an end view showing another modified form of means for securing the sections together.

FIG. 10 is a view similar to FIG. 1 showing another form of the device.

FIG 11 is a view taken at line 11—11 of FIG. 10.

FIG. 12 is a view similar to FIG. 10 but also showing a top section of the device in place on the back seat of the automobile.

FIG. 13 is a view showing a section of the device on the rear seat of the automobile.

FIG. 14 is a sectional view showing fragments of different sections of the device, and interengaging means retarding shifting of the sections.

FIG. 15 is a view taken at the position of the arrow 15 in FIG. 14 showing an alternate means for securing the sections together.

FIG. 16 is a view similar to FIG. 1 showing still another form of device.

FIG. 17 is a side view of the device shown in FIG. 16.

FIG. 18 is a front view of the device shown in FIGS. 16 and 17.

DETAILED DESCRIPTION

As referred to above, the device of the invention is particularly adapted to accommodating the child in the different phases of growth. To this end, the device is made up of a plurality of sections that may be placed in different positions to provide a footstool, or foot rest, of different heights. Certain sections may be used as a seat, at times. In the beginning, when the child sits on the back seat of the car, his legs are not long enough to reach the floor, and they therefore dangle, producing a pulling effect on the thighs, with consequent aches and pains in the thighs and other parts of the body. To counteract this condition, the footstool or foot rest, is provided and placed, in one case, in the well between the seats of the automobile. This footstool is positioned or fitted so as to be of different height in different stages of use thereof, as explained hereinbelow. In the beginning the stool is of maximum height so that the child can easily place the lower parts of his legs thereon, and as he grows, the legs extend further downwardly, and the stool need not be so high. In one form the device is made up of two sections, detachably secured together, and as the child grows, the lower section can be utilized in the well as a footstool, and the other, placed on the automobile seat, and the child sits thereon. This procedure is used when the child grows, enabling him to sit higher as time goes on, while at the same time his legs can reach further down to a lower level of the section on the floor.

Attention is directed to the first form of the invention, in FIGS. 1-9, showing in semi-diagrammatic view, the device of the invention indicated at 20 in place in an automobile 22. The automobile is represented by only a bare number of elements, including a back seat 24 and a front seat 26, with a well 28 therebetween. The back seat 24 includes a top seating surface 30 and a backrest 32, as well as a front surface 34 which may be inclined variously, most often with its upper portion foremost and its lower portion inclined rearwardly. The front seat 26 has a rear surface 36 25 which is usually inclined downwardly and forwardly. The well 28 is thus formed between those surfaces, 34, 36, and the floor 38 of the body of the automobile.

In FIG. 1, a child 40 is represented seated in a children's car seat 41 on the back seat, with his feet on the stool 20.

As will be explained hereinbelow, the stool in one form is made up of sections that are detachably secured together, and when it is in its full and complete size, containing all of the sections, it is dimensioned so that the top surface 42 is adjacent to the seating surface 30 of the back seat. This relationship need not be accurate, but it is dimensioned from a practical standpoint to accommodate a child in his seating position. It is preferably below, but it may even be higher. It will be understood that the stool is to be used with a safety seat required for seating children, and does not interfere with the use of safety seats.

FIGS. 1 and 2 show the stool or device 20, which in this case is made up of three sections 44, 45, 46, stacked vertically and secured together as indicated at 48. This securement means in a preferred form, includes pins or stakes 49 extending downwardly on each of the top two sections, and fitted in recesses 50 in the sections therebelow. The sections include top elements 44a, 45a, 46a respectively forming horizontal panels, and the lower two include legs 44b, 45b shown in FIG. 4. On the bottom section 44, the legs 44b are relatively short, and are in the form of feet, having needles or spikes 50 which penetrate into the supporting surface, or engage that surface in a gripping fashion. The various surfaces have texture enabling penetration thereinto to a limited extent of the needles or spikes. The surfaces are not punctured, but they have hollows which may be referred to generically as interstices.

Preferably the top section 46 is provided with ribs 51 extending lengthwise of the stool, i.e., transversely of the automobile. These ribs provide a friction surface for engagement by the feet of the child, when the device is used as a stool.

The sections of the device may be made of any suitable material, preferably plastic, of rigid character to stand upright under the forces encountered, although they may be provided with reinforcement elements if desired.

The overall shape of the stool, as viewed in FIGS. 1 and 2 conforms generally with the surfaces of the well 28 in the automobile, preferably engaging the front surface of the back seat of the automobile, and the back surface of the front seat, or at least being close thereto, to eliminate shifting of the device in the automobile, or at least to minimize such shifting. Preferably the bottom section 44 is provided with a forward extension 53 that extends into the space 54 usually existing under the front seat.

It is also possible, and practical, to place the stool 20 (FIG. 5A) in the front of the automobile, in front of the front seat. In such a case the lower portion thereof, at the front, extends into the space under the dashboard, indicated at 56, in those cases where the various components are arranged so that they will accommodate the stool.

The stool is dimensioned and proportioned so as to engage not only the rear and front seats of the automobile, but preferably engaging the side doors of the automobile as well, so as to positively secure the device in position. This may not be possible in all occasions, and in any case where the device does not reach the side supporting surfaces of the automobile, the antifriction surfaces, such as the needles 50 (FIG. 4), will hold, or tend to hold, the device in place against shifting.

The specific construction of the sections of the device may assume any of various forms.

FIGS. 7 and 8 show another means for securing the sections together. These figures are fragmentary, and show the stool as including a lower section 82 and an upper section 83. They are secured together by means of grooves 85 in the upper section and tongues or beads 86 in the lower section. The sections are interconnected by sliding them relatively together in the direction of the arrow 88.

FIG. 9 shows still another form of means for securing the sections together. In this latter figure, which is also fragmentary, a lower section 90 and an upper section 91 are provided by ordinary latch means or buckle means 92 detachably securing the two sections together, this latch means including a flap hinged on the upper section and a button on the lower section cooperating therewith.

Attention is directed to FIG. 6 in conjunction with FIG. 1. In FIG. 1 the three sections are secured together in a stack, and the stack is positioned in the well 28.

As the child grows, and his legs lengthen, the sections 44, 45, 46 of the stool may be separated, the top one 46 and the lower one 44 are secured together, put in the well, and the middle one set aside. This is represented in FIG. 6. In this position, the child's legs are long enough to reach the lower section that is in the well.

While the preferred form of interconnecting the sections of the stool is that of FIGS. 2-4, the invention is of sufficient breadth to cover other forms.

FIGS. 10-15 show the second form of the stool. In this case each of the sections may be made up of a core or body 58 with a covering 60 thereover. The materials used may be any of various kinds, the core 58 for example being of somewhat rigid plastic material, and the covering 60 of cloth, plastic, etc., preferably thin. The proportions are shown considerably exaggerated in FIG. 14. The material making up the core may be quite rigid as stated, or it may be resilient, as desired. The whole device 73 (FIGS. 10, 11) may in general terms be referred to under the common generic term "cushion", but it need not be resilient or soft, that feature being of secondary importance.

The sections 78 and 79 (FIG. 14) are so made that when they are separated each is complete and self-contained. The manner in which the covering 60 is applied to the core, and the manner in which the various coverings surround any one section, indicated at 61 may be as desired, the consideration being that when the sections are separated, each is complete and can be used by itself in any of various positions. FIG. 14 shows a construction which retards transverse displacement of the sections, relative to each other, and may be considered within the broad definition of means interconnecting the sections. In FIG. 14, the upper section 79 has a bottom covering layer 63 which may be of rubber-like material, of tough and strong nature, having needles or spikes 64 extending downwardly. These needles may be integral with the covering and when either of the sections, e.g. 78, is lowermost, the needles penetrate into the interstices in the carpet 66 with which the floor is ordinarily covered, retarding lateral displacement of the section. From a practical standpoint, it may be considered that it is actually prevented from being displaced laterally.

When a section, e.g. 79, is placed on the back seat of the automobile (FIG. 13) the needles 64 thereof penetrate into the seating surface 30 of the back seat. In this case also, the term penetration is to be interpreted broadly, the needles 64 finding their way into interstices of the item on which it is placed, as referred to above.

The invention also encompasses a form represented in FIG. 15, wherein a zipper is utilized for interconnecting the sections. Such a zipper is shown at 70 and is applied to the outer coverings 60 of the sections of the stool.

The needles 64 and zipper 70 are alternative, i.e., when one is used the other generally is not required.

As is generally known, many automobiles have what is known as a hump in the floor which is manifested in the well between the seats. This hump has to do with the drive mechanism of the automobile, and it extends above the otherwise lower portion of the floor of the well, the hump extending longitudinally fore-and-aft of the automobile. Such a hump is indicated at 72 in FIGS. 10, 11, and the stool 73 includes a main body 75 having a channel or groove 76 in its lower surface to accommodate that hump, the stool thereby being formed with legs 78 at the sides of the channel, and a top portion 80 extending over the channel. The stool 73 in FIG. 10 is viewed longitudinally of the car, the stool, as viewed, extending across the automobile. When the stool is placed in the well, the legs 78 extend down into engagement with the floor and are supported thereby, and the channel 76 receives the hump 72, the channel being preferably so dimensioned in height, that the top engages the hump and thus provides support for the top cross portion 80.

Another feature of this form of the stool (FIG. 11) is a reinforcing element 81 of inverted U-shape, and embodied in the body of the stool and surrounding the three sides of the channel. The device may be formed mainly of a relatively soft, or weaker, material and to reinforce the device against any possible weakness at the relatively thin portion 80 at the top, the reinforcing 81 provides the necessary strength in this regard. The material of which the device is made is mainly a plastic which is preferably generally rigid, but although it may have a limited yieldability, it does not possess the great strength that the reinforcing member 81 has, which may be made of metal.

Attention is directed to FIG. 12 in conjunction with FIG. 10. In FIG. 12, the sections of the stool are separated, the lower one 75 put in the well, the upper section 79 placed on the back seat, the child then sits on that section when the child's car seat is no longer needed.

Still another form of the stool is shown in FIGS. 16–18. In this form, the stool indicated in its entirety at 93 includes a top member 97 and two sections of legs 96, 98 located respectively on opposite sides of the hump. The legs preferably made of aluminum are adjustable. Legs 96 are attached to 97 mechanically. The legs show adjustment means 99 of suitable character, enabling vertical adjustment of the legs, in length. The top member 97 may be of rigid plastic, such as polyethylene, and it has ribs 100 on its upper surface, similar to the ribs 51 of FIGS. 3–5.

Preferably the stool of FIGS. 16–18 includes feet 102 on the legs, the feet having a roughened undersurface 103, for example having needles, engaging the floor of the automobile. Preferably at the forward edge, the feet 102 extend forwardly a relatively great extent to fit under the front seat of the automobile, in a manner referred to above in connection with FIGS. 1–4.

Generally summarizing, each of the stools is made up of sections enabling various ones of them to be used selectively accommodating the growth of the child, and also accommodating the interior structure of the automobile.

I claim:

1. A children's stool for use in an automobile having a back seat with a seating surface and a backrest, a front seat having a back surface that inclines downwardly and forwardly, and a well between the seats, wherein,
   the stool includes a plurality of separate sections arranged vertically in a stack,
   the stack being capable of being placed in the well, and the stack and back seat being so relatively dimensioned that when the stack is in the well, the top surface of the stack is adjacent the seating surface of the back seat,
   the stool confined laterally between and by the seats,
   adjacent sections having interacting elements operable for retarding the sections from shifting relative to each other out of the stack, and
   the stool having a front surface inclined generally complementally to the back surface of the front seat, and the stool having feet at its front extending forwardly beyond its said front surface.

2. A stool according to claim 1 wherein,
   the interacting elements include needles on one of the sections penetrating into interstices in the floor of the automobile.

3. A stool according to claim 1 wherein,
   the interacting elements include pins on one of the sections fitting in recesses in the other section.

4. A children's stool according to claim 1 wherein the automobile also has a hump in the floor of the well, wherein,
   the stool includes an under surface and end portions engaging and resting on the floor of the well and a center opening in its under surface receiving the hump, and
   the stool confined laterally between the seats.

5. A stool according to claim 4 wherein,
   the stool includes stacked sections and intersecting elements for preventing shifting of the sections out of the stack, and
   the interacting elements constitute parts of a zipper positively preventing such shifting.

6. A stool according to claim 4 wherein,
   an upper section includes needles on its lower surface penetrating into interstices in the section therebelow, and
   the bottom section includes needles on the lower surface penetrating into interstices in the floor of the well.

7. A stool according to claim 4 for use an automobile wherein also the seating surface of the back seat includes interstices and is thereby at least partially penetrable, and wherein,
   said interacting elements include needles,
   the stool includes a lower section and an upper section in a stack, and each section includes needles on its undersurface,
   the lower section is placeable on the back seat and in that position the needles thereon penetrate into the interstices in the seating surface on the back seat, and
   the upper section is placeable directly on the floor of the well and when in that position the needles thereon penetrate into interstices in the floor of the well.

8. A stool according to claim 4 wherein,
   the stool is made generally of relatively soft material, and it includes a re-enforcing inverted U-shape member of relatively strong material embedded in the soft material, and encompassing the hump, for re-enforcing the stool and particularly that portion above said opening.

9. A stool according to claim 4 wherein,
   the stool has laterally spaced legs, and the legs have feet on their lower ends with needles penetrating into interstices in surfaces therebelow.

10. A stool according to claim 4 wherein, the legs are adjustable in height by longitudinal contraction and extension of portions of the legs.

11. A method of providing stool means for an automobile having a back seat with a seating surface, a front seat, and a well between the seats, comprising the steps, providing a plurality of sections and detachably securing them together in a stack, placing the stack in the well, and predetermining the dimensions of the stack so that the top surface of the stack is adjacent to but below the seating surface of the back seat.

12. A method according to claim 11 and including the steps, placing certain of the sections in the well and certain sections on the seating surface of the back seat, whereby to enable a child to sit on the sections on the back seat, and place his feet on the sections in the well, at a later stage of growth of the child.

13. A method according to claim 12 and including the step, providing the sections of individually increasing thickness proceeding from the top down in the stack.

* * * * *